US006214530B1

(12) United States Patent
Morrison et al.

(10) Patent No.: US 6,214,530 B1

(45) Date of Patent: Apr. 10, 2001

(54) BASE FILM WITH A CONDUCTIVE LAYER AND A MAGNETIC LAYER

(75) Inventors: Eric D. Morrison, St. Paul, MN (US); Paola Puppo, Cogoleto (IT)

(73) Assignee: Tulalip Consultoria Comercial Sociedade Unidessoal S.A., Parish of San Pedro (PT)

(*) Notice: Subject to any disclaimer, the term of this patent is extended or adjusted under 35 U.S.C. 154(b) by 0 days.

(21) Appl. No.: 09/343,928

(22) Filed: Jun. 30, 1999

(51) Int. Cl.[7] ................................ G03C 1/85; G03C 1/93; G03C 1/89; B32B 27/06; B32B 19/00

(52) U.S. Cl. .......................... 430/527; 430/530; 430/532; 430/533; 430/534; 430/535; 430/536; 428/425.9; 428/447; 428/480; 428/481; 428/483; 428/500; 428/507; 428/511; 428/515; 428/522; 428/693; 428/702

(58) Field of Search .................................... 430/527, 530, 430/533, 534, 535, 536, 532; 428/425.9, 447, 483, 481, 480, 515, 507, 500, 511, 522, 693, 702

(56) References Cited

U.S. PATENT DOCUMENTS

| | | | |
|---|---|---|---|
| 2,627,088 | 2/1953 | Alles et al. . | |
| 2,739,971 | 3/1956 | Sawdey et al. . | |
| 3,782,947 | 1/1974 | Krall . | |
| 4,203,769 | 5/1980 | Guestaux | 430/631 |
| 4,225,665 | 9/1980 | Schadt, III | 430/529 |
| 4,363,872 | * 12/1982 | Ealding et al. | 430/535 |
| 4,394,442 | * 7/1983 | Miller | 430/533 |
| 4,478,907 | * 10/1984 | Van Gossum et al. | 430/533 |
| 4,990,276 | 2/1991 | Bishop et al. | 252/62.54 |
| 5,006,451 | 4/1991 | Anderson et al. | 430/527 |
| 5,198,499 | 3/1993 | Anderson et al. | 525/201 |
| 5,204,219 | 4/1993 | Van Ooij et al. | 430/531 |
| 5,294,525 | 3/1994 | Yamauchi et al. | 430/530 |
| 5,340,676 | 8/1994 | Anderson et al. | 430/527 |
| 5,356,468 | 10/1994 | Havens et al. | 106/195 |
| 5,360,706 | 11/1994 | Anderson et al. | 430/530 |
| 5,366,544 | 11/1994 | Jones et al. | 106/187 |
| 5,366,855 | 11/1994 | Anderson et al. | 430/530 |
| 5,378,577 | 1/1995 | Smith et al. | 430/523 |
| 5,378,592 | 1/1995 | Nakanishi et al. | 430/533 |
| 5,395,743 | 3/1995 | Brick et al. | 430/496 |
| 5,407,603 | 4/1995 | Morrison | 252/518 |
| 5,427,835 | 6/1995 | Morrison et al. | 430/527 |
| 5,439,785 | 8/1995 | Boston et al. | 430/530 |
| 5,447,832 | 9/1995 | Wang et al. | 430/523 |
| 5,455,153 | 10/1995 | Gardner | 430/530 |
| 5,468,498 | 11/1995 | Morrison et al. | 524/408 |
| 5,510,233 | 4/1996 | Nakanishi et al. | 430/535 |
| 5,514,528 | * 5/1996 | Chen et al. | 430/530 |
| 5,532,118 | 7/1996 | Bauer et al. | 430/533 |
| 5,549,846 | 8/1996 | Tixier et al. | 252/315.01 |
| 5,576,163 | 11/1996 | Anderson et al. | 430/530 |
| 5,597,680 | 1/1997 | Wang et al. | 430/527 |

(List continued on next page.)

FOREIGN PATENT DOCUMENTS

| | | |
|---|---|---|
| 0 748 858 | 12/1996 | (EP) . |
| 0 749 041 | 12/1996 | (EP) . |
| 0 603 582 | 2/1997 | (EP) . |
| 5119433 | 5/1993 | (JP) . |

*Primary Examiner*—Richard L. Schilling

(74) *Attorney, Agent, or Firm*—Mark A. Litman & Associate; Mark A. Litman

(57) ABSTRACT

A base film including a substrate, an adhesion layer, a conductive layer, and a magnetic layer is provided. The adhesion layer preferably includes a sulfonated polyester/vinyl addition polymer, wherein the adhesion layer is disposed between the substrate and the conductive layer and improves adhesion between these layers, even under wet conditions. An adhesion layer is particularly useful in photographic elements and is at least located on a surface of the substrate that is opposite a silver halide emulsion layer, although emulsion receptivity can be enhanced by including an adhesion layer on the emulsion-side of the substrate.

26 Claims, 1 Drawing Sheet

U.S. PATENT DOCUMENTS

| | | | | |
|---|---|---|---|---|
| 5,597,681 | | 1/1997 | Anderson et al. | 430/527 |
| 5,607,825 | | 3/1997 | Carlson | 430/527 |
| 5,650,265 | | 7/1997 | Sniadoch et al. | 430/527 |
| 5,702,876 | | 12/1997 | Taylor et al. | 430/496 |
| 5,709,984 | * | 1/1998 | Chen et al. | 430/527 |
| 5,709,985 | | 1/1998 | Morrison et al. | 430/527 |
| 5,882,466 | | 3/1999 | Grootaert et al. | 156/329 |
| 6,010,836 | * | 1/2000 | Eichorst et al. | 430/527 |

* cited by examiner

BASE FILM WITH A CONDUCTIVE LAYER AND A MAGNETIC LAYER

BACKGROUND OF THE INVENTION

1. Field of the Invention

The present invention relates to a base film including a magnetic recording layer and an antistatic layer (i.e., a conductive layer) and, in particular, to a base film having an adhesion layer disposed between the substrate and the antistatic layer, and photographic elements including the same.

2. Background of the Invention

The use of polymeric film bases for carrying photographic layers is well known. In particular, photographic elements which require accurate physical characteristics use polyester film bases, such as poly(ethylene terephthalate) film bases, and cellulose ester film bases, such as cellulose triacetate film bases.

In recent years, with the development of rapid film processing labs, the amount of information that would be desirable to record and read on a photographic element has increased. For example, it may be desirable to record information relating to the element's sensitivity, exposure conditions (e.g., exposure time and f-stop value), date and time of exposure, name of photographer, various messages related to the development and printing (e.g., number of reprints, portion to be zoomed, and the like) of the photographic element.

Thus, it is known to provide a magnetic layer in a photographic element for recording such information. In such a photographic element, typically a silver halide portion of the element is employed to record images by customary photographic process while the magnetic layer is employed by techniques similar to those employed in the magnetic recording art. However, the requirements of recording and reading magnetic signals from a magnetic layer in a photographic element are typically more stringent than that found in conventional magnetic recording because of the loading of magnetic particles in the magnetic layer and the nature of the photographic element. Further, the presence of the magnetic layer cannot interfere with the primary function of the photographic element which is to achieve realistic visual reproductions of the original image. In addition, the magnetic layer must be capable of accurately recording the information applied thereto and reproducing (reading) the information on demand.

In addition, a photographic element including a magnetic layer should be capable of repeated use in both the recording and reading modes, and, therefore, photographic element should be sufficiently durable. For example, during the residence of the film in a camera, entries may be made to the magnetic layer for every exposure, and an indeterminate number of read operations are conducted depending on the particular application for which the film is used. This is particularly true in the processing of film and in subsequent use of the processed film for additional copies, where the film is typically wound under tension in a liquid environment. In some instances, it is reasonable to expect that the film must be able to withstand multiple contacts with magnetic heads, sometimes 50 operations or more.

Further, the formation of static electric charges on the film base can be a serious problem in the production of photographic elements. While coating the light-sensitive emulsion, electric charges which accumulate on the base discharge, producing light which is recorded as an image on the light-sensitive layer. Other drawbacks which result from the accumulation of electric charges on polymeric film bases are interference with magnetic data recording and reading, the adherence of dust and dirt, coating defects and limitation of coating speed.

Additionally, photographic elements comprising light-sensitive layers coated onto polymeric film bases, when used in rolls or reels, which are mechanically wound and unwound, or in sheets, which are conveyed at high speed, tend to accumulate static charges and record the light generated by static discharges. Moreover, charge buildup can create difficulties in processing, such as jamming as the photographic films are fed through processing equipment.

The static-related damages occur not only before the photographic element has been manufactured, exposed, and processed, but also after processing when the photographic element including the image is used to reproduce and enlarge the image. Accordingly, it is desired to provide permanent antistatic protection which retains its effectiveness even after processing.

To overcome the adverse effects resulting from accumulation of static electrical charges, photographic elements are provided with antistatic layers including electrically conductive materials which are capable of transporting charges away from areas where they are not desired. Typically, such antistatic layers contain electrically conductive substances, in particular polyelectrolytes such as the alkali metal salts of polycarboxylic acids or polysulfonic acids, or quaternary ammonium polymers, which dissipate the electrical charge by providing a surface which conducts electricity by an ionic mechanism. However, such layers are not very suitable as antistatic layers because they lose effectiveness under conditions of low relative humidity, become sticky under conditions of high relative humidity, and lose their antistatic effect after passage through photographic processing baths.

Antistatic materials that conduct electrons by a quantum mechanical mechanism rather than ions by an ionic mechanism are preferred because antistatic materials that conduct electrons by a quantum mechanical mechanism are effective independent of humidity. They are suitable for use under conditions of low relative humidity, without losing effectiveness, and under conditions of high relative humidity, without becoming sticky. Defect semiconductor oxides and conductive polymers have been proposed as electronic conductors which operate independent of humidity. A major problem, however, with defect electronic conductors is that they generally cannot be provided as thin, transparent, relatively colorless coatings by solution coating methods.

Vanadium oxide antistatic coatings have been taught for use in photographic elements. See, U.S. Pat. Nos. 5,702,876 and 5,709,985 (both to Morrison et al.) for discussions related to vanadium oxide antistatic coatings in photographic elements that can either be located on the emulsion side or the back side of the photographic element. For example, the antistatic layer comprising vanadium oxide located on the back side of the photographic element (i.e., on the side of the film base opposite to the image-forming light-sensitive halide emulsion layer) as outermost layer, with or without a protective abrasion-resistant topcoat layer; or it can be located as a subbing layer underlying a silver halide emulsion layer or an auxiliary gelatin layer. For example, U.S. Pat. No. 5,006,451 (Anderson et al.) describes a photographic material comprising a film base having thereon an antistatic layer comprising vanadium oxide and a barrier layer which overlies the antistatic layer.

SUMMARY OF THE INVENTION

What is yet needed is a photographic element including a base film capable of recording information and providing protection against static-related damage having improved durability, such as improved adhesion between the layers of the base film under wet conditions typically used in processing techniques.

One aspect of the present invention provides a base film including a substrate, an adhesion layer coated on a surface of the substrate wherein the adhesion layer comprises a vinyl-addition polymer and a sulfonated polymer, a magnetic layer, and a conductive layer comprising vanadium oxide, wherein the conductive layer is positioned between the adhesion layer and the magnetic layer. Preferably, the sulfonated polymer includes a polyester. Preferably, the vinyl addition polymer is formed from alkyl esters of acrylic monomers, wherein the alkyl esters of acrylic monomers are preferably selected from the group of methyl methacrylate, ethyl methacrylate, butyl methacrylate, ethyl acrylate, and butyl acrylate. An adhesion layer may also include an adhesion promoter, preferably, the adhesion promoter is an epoxy-silane.

Additionally, a base film of the present invention can further include an emulsion side adhesion layer coated on a second surface of the substrate. A subbing layer can further be included on the emulsion side adhesion layer.

The conductive layer can further include a chlorinated latex polymer. Preferably, the conductive layer includes a weight ratio of the vanadium oxide to the chlorinated latex polymer in the conductive layer of about 1:3 to about 1:600. The chlorinated latex polymer is preferably a polyvinyl chloride.

The surface of the substrate can be treated with an energy source, wherein the energy source is preferably selected from the group of corona discharge, glow discharge, flame, electron bombardment, ultraviolet radiation, and a combination thereof. The substrate preferably includes a polyester, more preferably a polyester selected from the group of poly(ethylene terephthalate) and poly(ethylene naphthalate).

Preferably, the magnetic layer is formed from a composition comprising a non-aqueous solvent and a plurality of magnetic particles.

Preferably, the base film exhibits a static dissipation rate from a charge of about 5000V to about 50V in less than about 0.05 seconds.

Another aspect of the present invention provides a base film including a substrate, an adhesion layer coated on a surface of the substrate wherein the adhesion layer comprises a vinyl addition polymer, a sulfonated polymer and an epoxy-silane, a transparent magnetic layer, and a transparent conductive layer comprising vanadium oxide, wherein the conductive layer is positioned between the adhesion layer and the magnetic layer.

Yet another aspect of the present invention provides a photographic element comprising a substrate, an adhesion layer coated on a first surface of the substrate wherein the adhesion layer comprises a vinyl addition polymer and a sulfonated polymer, a magnetic layer, and a conductive layer comprising vanadium oxide, wherein the conductive layer is positioned between the adhesion layer and the magnetic layer, and an emulsion layer on a second surface of the substrate. Preferably, the photographic element includes an emulsion side adhesion layer coated on the second surface of the substrate between the emulsion layer and the second surface of the substrate. In one embodiment, the emulsion side adhesion layer preferably includes a vinyl addition polymer and a sulfonated polymer. The photographic element can also include a subbing layer between the emulsion side adhesion layer and the emulsion layer.

According to the present invention, a base film containing the adhesion layer, the conductive layer, and the magnetic layer exhibits a moderate level of haze. Preferably, the magnetic layer and the conductive layer are each a transparent layer. The level of haze typically has a value less than about 18%, preferably less than about 15%, when measured using a Gardner XL-211 Hazeguard System (available from Paul N. Gardner Company, Inc., Pompano Beach Fla.) following the manufacturer's instructions. The base film also exhibits a low level of coloration (blue light optical density of about 0.15) as measured using a Macbeth transmittance densitometer, available from Gretag-Macbeth Company, New Windsor N.Y.) and a static decay rate of 0.01 seconds for decay of a 5000V charge to less than 50V (using an Electrotech 406 D Static Decay Meter according to the manufacturer's instructions. The Electrotech 406 D meter is available from Electrotech Systems, Glenside, Pa.).

According to the present invention, the wet adhesion of the magnetic layer in a base film typically yields a scholastic score of at least 5, preferably at least 7, and more preferably at least 8. The wet adhesion of the magnetic layer can be tested by the method described in *British Journal of Photography Annual*, 1997, 201–205, and as further elaborated later herein. Additionally, a base film in accordance with the present invention possesses greater wet adhesion between the magnetic layer and the substrate than the same base film without the adhesion layer between the substrate and the conductive layer.

DETAILED DESCRIPTION OF THE PREFERRED EMBODIMENTS

Figure 1:
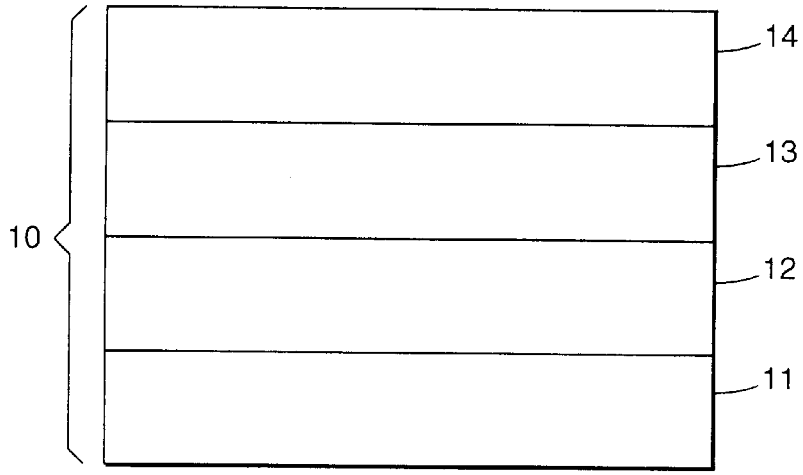
FIG. 1 shows a base film in accordance with the present invention.

Referring to FIG. 1, a base film 10 is shown in accordance with the present invention. Preferably, the base film 10 includes a substrate 11 having a first surface and a second surface. Coated on at least one surface of the substrate is an adhesion layer 12. A conductive (antistatic) layer 13 is preferably coated on the adhesion layer 12. Finally, the base film 10 includes a magnetic layer 14 that is preferably coated on the conductive layer.

Figure 2:
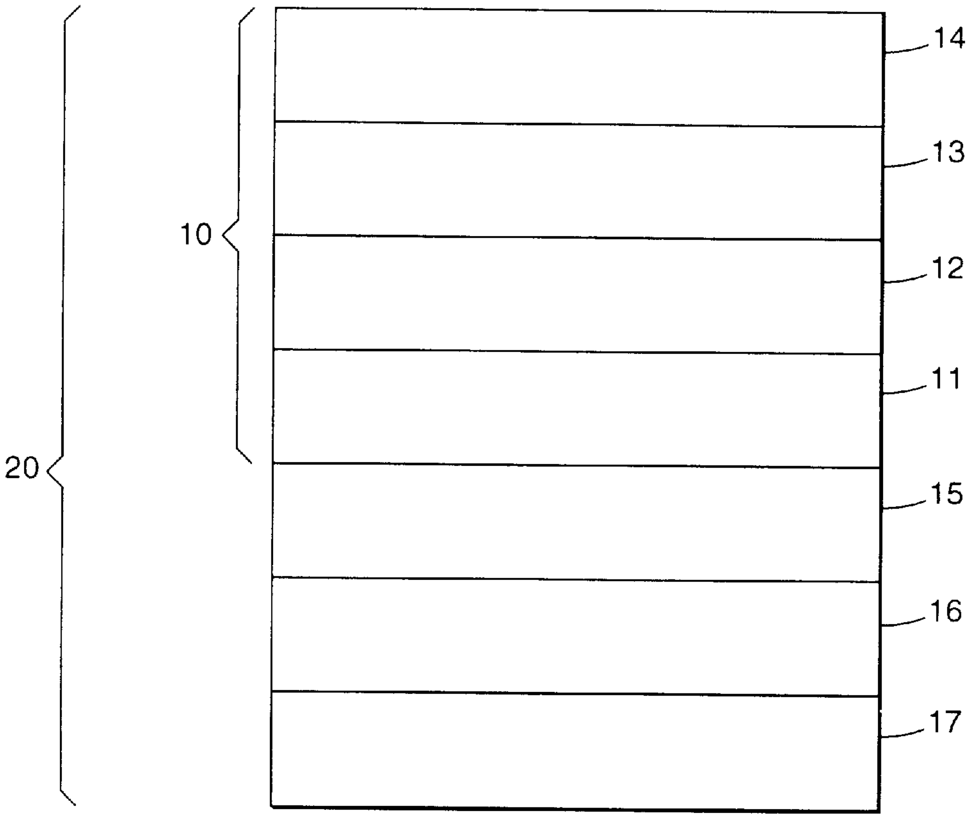
FIG. 2 shows a photographic element including a base film and emulsion layer, in accordance with the present invention.

Referring to FIG. 2, a photographic element 20 in accordance with the present invention preferably includes a base film and at least one silver halide photographic emulsion layer that is preferably coated on a surface of the substrate that is opposite the adhesion layer, conductive layer, and magnetic layer. Thus, as shown in FIG. 2, a first surface of the substrate 11 is layered with an adhesion layer 12, a conductive layer 13, and a magnetic layer 14. Additionally, the base film 10 can further include emulsion side coatings, i.e., layers formed on the second surface of the substrate, such as an emulsion side adhesion layer 15 and a subbing layer 16. Further, the photographic element includes at least one photographic emulsion layer 17. Optional layers may also be included, as will be discussed below.

Although the present invention is primarily applicable to photographic elements, particularly silver halide photographic elements, it is also applicable to thermally processable imaging elements, which include, for example, thermographic and photothermographic imaging elements. For the purpose of describing the present invention and for simplicity of expression, photographic elements will be primarily referred to throughout the specification. It is to be understood, however, that the invention also applies to other forms of imaging elements. A photographic element preferably includes a substrate having a first surface and a second surface. Preferably, a conductive layer, a magnetic layer and an adhesion layer including a non-aqueous solvent based chlorinated polymer are all on one surface of the substrate, i.e., these layers are on the first surface of the substrate and are collectively referred to as a "base film." Thus, imaging elements, for example, emulsion layers are then preferably on the second surface of the substrate, opposite the base film.

Substrate

In accordance with the present invention, suitable photographic substrates useful in the present invention can include, for example, films of various kinds of glasses such as soda glass, potash glass, borosilicate glass, quartz glass and the like; paper, baryta coated paper, paper coated with alpha olefin polymers, synthetic paper; polystyrene, ceramics, metals, foils; synthetic high molecular weight film materials such as polyalkyl acrylates or methacrylates, polystyrene, polyamides such as nylon, films of semisynthetic high molecular weight materials such as cellulose nitrate, cellulose acetate, cellulose acetate butyrate, and the like; homopolymers and copolymers of vinyl chloride, poly (vinylacetal), polycarbonates, homopolymers and copolymers of olefins such as polyethylene and polypropylene, and the like. Substrates according to the present invention have a first and second surface and are preferably opaque or transparent.

Polyester substrates are particularly advantageous in the invention because these substrates provide excellent strength and dimensional stability. Polyester base film substrates are well known, widely used, and typically prepared from high molecular weight polyesters prepared by condensing a dihydric alcohol with a dibasic saturated fatty carboxylic acid or derivative thereof. Suitable dihydric alcohols for use in preparing such polyesters are known in the art, and include any glycol wherein the hydroxyl groups are on the terminal carbon atom and contain from two to twelve carbon atoms such as, for example, ethylene glycol, propylene glycol, trimethylene glycol, hexamethylene glycol, decamethylene glycol, dodecamethylene glycol, 1,4-cyclohexane dimethanol, and the like.

Suitable dibasic acids useful for preparing polyesters include those containing from about two to about sixteen carbon atoms such as adipic acid, sebacic acid, terephthalic acid, isophthalic acid, 2,5-, 2,7-, and 2,6-naphthalene dicarboxylic acid and the like. Alkyl esters of acids such as those listed above can also be employed. Other alcohols and acids as well as polyesters prepared therefrom and the preparation of the polyesters are described in U.S. Pat. No. 2,720,503 (Alles), U.S. Pat. No. 2,901,466 (Kibler et al.) and U.S. Pat. No. 5,360,706 (Anderson et al.). Substrates containing poly (ethylene terephthalate) (PET), poly(ethylene naphthalate) (PEN), and poly(vinylidene chloride) (PVDC) primed PET are particularly preferred in the present invention.

Generally, polyester substrates are prepared by melt extruding the polyester through a slit die, quenching to the amorphous state, orienting by transverse and longitudinal stretching, and heat setting under dimensional restraint. The polyester substrate can also be subjected to a heat relaxation treatment to improve dimensional stability and surface smoothness.

The base film, including the substrate, according to the present invention, typically has a thickness that ranges from about 50 micrometer ($\mu$m) to about 200 $\mu$m, preferably from about 75 $\mu$m to about 100 $\mu$m.

Prior to application of any of the additional layers mentioned above, the substrate, such as polyester, may optionally be treated with an energy source. Treatment with an energy source, although optional in the present invention, may provide increased adhesion between the substrate and subsequently applied layers, such as the conductive layer. The energy source employed to treat the substrate include, for example, corona discharge, glow discharge, flame, electron bombardment, UV, plasma treatment in an oxygen or nitrogen containing atmosphere and the like. In the present invention, the substrate is preferably treated by corona discharge. The corona treatment levels range from about 0.05 Joules per square centimeter ($J/cm^2$) to about 2.0 ($J/cm^2$), with a power equaling about 10 watts to about 25 kilowatts.

Adhesion Layer

Once a substrate has been selected and, if desired, treated with an energy source, an adhesion layer is preferably applied to at least one surface of the substrate in accordance with the present invention.

Preferably, the polymer included in an adhesion layer in accordance with the present invention is a water dispersion (latex) of a vinyl addition polymer, also referred to herein as a "vinyl hybrid polymer latex." The term "dispersion" means a mixture of a polymer in water or aqueous-based liquids. The particles can be dissolved or they can be dispersed in the liquid medium and can have a maximum dimension of about 1 $\mu$m to about 10 $\mu$m.

Useful co-monomers to prepare a vinyl hybrid polymer latex in useful in the present invention include: (a) acrylic and methacrylic acid, itaconic acid, esters of these, and the like; (b) styneric, $\alpha$-methylstyrene, and p-chlorostyrene; (c) acrylamides and methacrylamides; (d) ethylenically unsaturated monomers such as vinyl chloride, vinylidene chloride, vinyl acetate, vinylidene fluoride, ethylene, and vinyl azlactones; (e) allyl derivatives such as diallyl phthalate, triallyl cyanurate, and the like, (f) ethylenically unsaturated sulfonated monomers such as 2-acrylamido-2-methyl propane sulfonic acid, g) nitrile derivatives of acrylic and methacrylic acid, such as acrylonitrile, h) cyanoacrylates such as ethyl cyanoacrylate, and i) diene compounds such as butadiene, norbornene, and chloroprene.

More preferably, an adhesion layer useful in the present invention comprises a sulfopolymer/vinyl hybrid polymer latex. Such a hybrid latex can be prepared, for example, by conducting vinyl addition polymerization of unsaturated monomers in aqueous medium in the presence of a sulfonated polymer. Sulfonated polymers useful to prepare sulfopolymer/vinyl hybrid polymer latexes include sulfonated polyesters are commercially available under the trade designations EASTMAN AQ 55D and EASTMAN AQ 29D polymers (available from Eastman Chemical Company, Kingsport Tenn.). A sulfopolymer/vinyl hybrid polymer latex which is useful in the present invention is commercially available under the trade designation EASTEK 2400 Polymer Dispersion, from Eastman Chemical Company, Kingsport, Tenn. Typically, because a dispersing agent used in the emulsion polymerization reaction is a sulfopolymer, the resulting hybrid emulsion is preferably substantially free from surfactants. As will be recognized by one with ordinary skill in the art, a surfactant that is present during the polymerization reaction cannot be easily removed after the reaction is complete, thus the amount and the type of surfactant cannot modified after polymerization.

Although water dispersible sulfopolyesters are known in the literature and are used for a wide variety of applications including primers, size coats, subbing for photographic emulsions, hydrophilic coatings for stain release, lithographic binders, and the like, it was surprisingly found that an adhesion layer including a sulfopolymer/vinyl hybrid polymer located between the substrate and a conductive layer increased the adhesion of the layers under wet conditions, that simulated photographic film developing processes, as described herein.

According to the present invention, it may be advantageous to further add an adhesion promoter to the adhesion layer to provide additional adhesion between the substrate and subsequent layers. Preferred adhesion promoters in the adhesion layer of the present invention include silicon-containing compounds such as epoxy-silanes and amino-silanes, as is described in U.S. Pat. No. 5,439,789 (Boston et al.); U.S. Pat. No. 5,411,787 (Kulkarni et al.); and U.S. Pat. No. 5,882,466 (Grootaert et al.). Preferred epoxy-silane compounds useful in the present invention are γ-glycidoxypropyl-trimethoxy-silane, and β-(3,4-epoxycyclohexyl)ethyl-trimethoxy-silane. These epoxy-silane compounds can be prepared according to methods known in the art.

Epoxy-silane compounds may be added to the adhesion layer coating solution containing the vanadium oxide and polymer as neat liquids, as solids, or as solutions in suitable solvents. The epoxy-silane compounds may be hydrolyzed completely or partially before addition. By "partially hydrolyzed," it is meant that not all of the hydrolyzable silicon-alkoxide or silicon-carboxylate groups have been removed from the silane by reaction with water. Hydrolysis of epoxy-silane compounds is conveniently done in the presence of water and a catalyst such as an acid, a base, or fluoride ion. The hydrolyzed epoxy-silane compounds may exist as siloxane polymers or oligomers resulting from condensation of silanol groups produced in the hydrolytic reaction of the epoxy-silane compound with other silanol groups or with unreacted silicon-alkoxide or silicon-carboxylate bonds. It may be desirable to add epoxy-silane compounds in the form of co-hydrolysates or co-hydrolysates and co-condensates with other, non-epoxy-silane compounds. Other useful adhesion promoters include non-silane epoxy compounds such as polyethylene glycol diglycidyl ethers, bisphenol A diepoxide, epoxy containing polymers, epoxy containing polymer lattices, and epoxy functional monomers.

Useful amino-silane compounds include, for example, 3-aminopropyl-trimethoxy-silane, 3-aminopropyl-triethyoxy-silane, addition products of 3-glycidoxypropyl-alkoxy-silane and secondary hydroxy alkylamines, and mixtures thereof. Amino-silane compounds, are further described in U.S. Pat. No. 5,411,787 (Kulkarni et al.) and can be further blended with other silane coupling agents, such as methyl-trimethoxy-silane, dimethyl-diethoxy-silane, methacrylolpropyl-trimethoxy-silane, dialkylamine addition products of glycidoxypropyl-alkoxysilane, and tripropylamine addition products of glycidoxypropyl-dimethoxy-silane. Other examples of useful aminosilane compounds include, for example, 3-aminopropyl-triethoxy-silane, N-(2-aminoethyl)-3-aminopropyl-trimethoxy-silane, N-(2-vinylbenzylamino)ethyl-3-aminopropyl-trimethoxy-silane, 4-aminobutyl-triethoxy-silane, (aminoethylaminomethyl) phenethyl-trimethoxy-silane, B(2-aminoethyl)-3-aminopropylmethyl-dimethoxy-silane, B2-aminoethyl-3-aminopropyltris(2-ethylhexoxy)-silane, 6-(aminohexylaminopropyl)-trimethoxy-silane, p-aminophenyl-trimethoxy-silane, 3-(1-aminopropoxy)-3,3-dimethyl-1-propenyl-trimethoxysilane, 3-aminopropyltris (methoxyethoxyethoxy)-silane, 3-aminopropyl-methyl-diethoxy-silane, 3-aminopropyl-triethoxy-silane, 3-aminopropyl-trimethoxysilane, ω-aminoundecyl-trimethoxy-silane, and those further described in U.S. Pat. No. 5,882,466 (Grootaert et al.).

The silane compounds as described above, can be present in the adhesion layer in any amount that will provide effective adhesion-promoting properties. For example, the adhesion layer can contain from about 1 to about 50 parts by weight of a silane compound, and preferably from about 5 to about 20 parts by weight silane compound, based on 100 parts of the dried adhesion layer.

The proportions of the silane compound in the adhesion layer according to the invention can be widely varied to meet the requirements of the particular photographic element or base film which is to be provided. Typically, the weight ratio of a selected silane to a polymer of the adhesion layer, such as the preferred sulfopolymer/vinyl hybrid polymer, will be in the range of about 1:99 to about 1:1, and preferably of about 1:19 to about 1:4.

A surfactant may be employed in the adhesion layer of the invention to allow for the uniform wetting of a substrate surface by the coating composition. A suitable surfactant is one that does not interfere with the adhesive properties of the adhesion layer or subsequently deposited coatings. One such surfactant is a nonionic surfactant. A preferred nonionic surfactant for use in the present invention is the para-octyl phenol ether of poly ethylene glycol having approximately 10 carbon atoms, commercially available under the trade designation TRITON X-100, from Aldrich Chemicals, Milwaukee, Wis. Other useful surfactants include phosphate esters, sulfonates such as sodium dodecyl sulfate, and perfluoroalkyl sulfonic acid salts. The surfactant can be present in the adhesion layer in any amount that will provide effective adhesion-promoting properties. For example, the adhesion layer can contain from about 0.1 to about 10 parts by weight of a surfactant, and preferably from about 0.5 to about 2.0 parts by weight surfactant, based on 100 parts of the adhesion layer coating solution. Additionally, depending upon the substrate, wetting out completely can be difficult, so it is sometimes convenient to alter the coating composition by the addition of organic solvents, preferably water-miscible organic solvents.

The thickness of the adhesion layer according to the present invention, typically ranges from about 10 nm to about 1,000 nm, preferably from about 10 nm to about 500 nm, and more preferably from about 100 nm to about 400 nm.

Conductive Layer

Once an adhesion layer has been applied to a surface of the substrate, additional layers may be applied to the substrate to form a base film. Typically, a conductive layer containing vanadium oxide is applied to the primed first surface of the substrate. The thickness of the conductive layer according to the present invention typically ranges from about 20 nm to about 1000 nm, preferably from about 50 nm to about 1,000 nm, and more preferably from about 200 nm to about 400 nm.

A suitable conductive layer for a base film according to the present invention, is typically prepared from vanadium oxide colloidal dispersions. As used herein, "vanadium oxide" colloidal dispersions refer to dispersions of mixed valence vanadium oxide, wherein the formal oxidation states of the vanadium ions are typically +4 and +5. In the art, such species are often referred to as $V_2O_5$. In preferred embodiments, the ratio of $V^{4+}$ ions to the total concentration of vanadium ions, i.e., $V^{4+}+V^{5+}$ ions, is between about 0.01:1 to about 0.3:1, and more preferably between about 0.05:1 to about 0.2:1. In the aged colloidal form, e.g., several hours at about 80° C. or more or several days at room temperature, vanadium oxide consists of dispersed fibrillar particles of vanadium oxide which preferably have a thickness in the range of about 0.02 micrometer (μm) to about 0.08 μm and length up to about 4 μm.

As used herein, the terms "sol," "colloidal dispersion," and "colloidal solution" are used interchangeably. They all refer to a uniform suspension of finely divided particles in a continuous liquid medium. The average particle size in a sol or colloidal dispersion is usually between about $5\times10^{-4}$ μm to about $5\times10^{-1}$ μm.

Vanadium oxide colloidal dispersions are known to possess effective antistatic characteristics even when low concentrations of vanadium are employed. Advantageously, colloidal dispersions containing low concentrations of vanadium are typically less colored, more transparent, and in some circumstances more adherent than coatings made from vanadium oxide colloidal dispersions prepared from previously known synthetic methods. Vanadium oxide colloidal dispersions used in the present invention are prepared by hydrolyzing vanadium oxoalkoxides with an excess of water. The vanadium oxoalkoxides can be any of a variety of compounds that can produce colloidal dispersions capable of forming, i.e., usable to produce, conductive coatings with the properties desired as defined herein.

Vanadium oxide sols, (i.e., colloidal dispersions) used in the present invention are prepared by hydrolyzing vanadium oxoalkoxides with an excess of water, preferably deionized water. As used herein, "vanadium oxoalkoxides," refer to vanadium complexes with an oxide (═O) ligand and at least one alkoxide (—OR) ligand per vanadium atom. It is to be understood, however, that complexes referred to herein as vanadium oxoalkoxides may also include ligands other than the oxide and alkoxide groups. Examples of other ligands that may be present in the vanadium oxoalkoxides used in the present invention include carboxylates, sulfides, selenides, β-diketonates, halides, and pseudohalides such as $SCN^-$ and $CN^-$. Preferably, however, the vanadium oxoalkoxides are trialkoxides with one oxide and three alkoxide ligands. The vanadium oxoalkoxides useful in the base films and methods of preparing the base film of the present invention may be monomeric, dimeric, or polymeric.

Vanadium oxoalkoxides can be prepared in situ (i.e., without isolation and/or purification of the vanadium oxoalkoxide prior to use), by combining a vanadium oxide precursor species and an alcohol. The vanadium oxide precursor species is preferably a vanadium oxyhalide or vanadium oxyacetate. If the "vanadium oxoalkoxide" is prepared from a vanadium oxide precursor species, it may include ligands other than the oxide and alkoxide groups. For example, if a vanadium dioxide acetate is the vanadium oxide precursor species, the "vanadium oxoalkoxide" will typically contain oxide, alkoxide, and acetate ligands.

Preferably, the vanadium oxoalkoxide is a trialkoxide of the formula $VO(OR)_3$, wherein each R is substituted or unsubstituted and is independently selected from a group consisting of aliphatic, aryl, heterocyclic, and arylalkyl radicals. As used herein, "substituted" R groups, (i.e., substituted organic groups) mean that one or more hydrogen atoms are replaced by a functional group that is nonreactive to hydrolysis, and noninterfering with the formation of colloidal dispersions. Preferably, such functional groups include halide, hydroxide, thiol, and carbonyl groups, or mixtures thereof.

Each R is preferably independently selected from the group consisting of $C_{1-10}$ alkyl, $C_{1-10}$ alkenyl, $C_{1-10}$ alkynyl, $C_{1-18}$ aryl, and $C_{1-18}$ arylalkyl radicals. These radicals can be substituted or unsubstituted, i.e., contain only hydrogen atoms. If substituted, they are preferably substituted with a functional group such as a halide, hydroxide, thiol, carbonyl, or mixtures thereof. More preferably, each R is independently selected from a group consisting of unsubstituted $C_{1-6}$ alkyl radicals. When it is said that each R is "independently" selected from a group, it is meant that not all R groups in the formula $VO(OR)_3$ are required to be the same.

In the context of the present invention, the term "aliphatic" means a saturated or unsaturated linear, branched, or cyclic hydrocarbon radical. This term is used to encompass alkyls, alkenyls such as vinyl radicals, and alkynyls, for example. The term "alkyl" means a saturated linear or branched hydrocarbon radical. The term "alkenyl" means a linear or branched hydrocarbon radical containing at least one carbon—carbon double bond. The term "alkynyl" means a linear or branched hydrocarbon radical containing at least one carbon—carbon triple bond. The term "heterocyclic" means a mono or polynuclear cyclic radical containing carbons and one or more heteroatoms such as nitrogen, oxygen, or sulfur or a combination thereof in the ring or rings, such as furan, thymine, hydantoin, and thiophene. The term "aryl" means a mono or polynuclear aromatic hydrocarbon radical. The term "arylalkyl" means a linear, branched, or cyclic alkyl hydrocarbon radical having a mono or polynuclear aromatic hydrocarbon or heterocyclic substituent. The aliphatic, aryl, heterocyclic, and arylalkyl radicals can be unsubstituted, or they can be substituted with various substituents such as Br, Cl, F, I, and OH groups.

In accordance with the present invention, a vanadium oxide colloidal dispersion can be applied to the first surface of a substrate by a variety of conventional coating methods. These include die coating, roll coating, brush coating, hopper coating, spray coating, curtain coating, slide coating, knife coating, and rotogravure coating. Preferably, a die coating process is employed. These methods, and the techniques by which they are implemented, are all well known in the coating industry.

The amount of vanadium oxide colloidal dispersion used in the coating process can be widely varied. The upper limit of the amount used is generally controlled by the quality of the particular dispersion and the desire for a transparent and/or relatively colorless coating, i.e., one that is difficult to detect by the human eye.

Because vanadium oxide colloidal dispersions are typically colored, the more material used, the more the coating is colored. However, if the vanadium oxide coating weight is sufficiently low, the coating does not usually appear colored. Typically, an apparently transparent and/or colorless vanadium oxide coating can be obtained with a coverage of vanadium oxide of no more than about 6 $mg/m^2$, preferably with no more than about 3 $mg/m^2$, and more preferably with no more than about 1.5 $mg/m^2$. By transparent and/or colorless, it is meant that the coatings do not show significant absorption in the visible region of the spectrum and are substantially undetectable using, for example, a Densitometer. That is, although coatings can be prepared with coverage of about 12 $mg/m^2$ and higher, for many uses it is preferable to have as low a coating weight coating as possible, e.g., no more than about 3 $mg/m^2$, to decrease the color imparted to the coating, increase its transparency, improve uniformity, and, in certain circumstances, improve adhesion. Such low coating weight coatings typically require a high quality colloidal dispersion, such as can be produced as described in U.S. Pat. No. 5,407,603 (Morrison), because the lower the quality of the colloidal dispersion, the more material is required to produce an acceptable conductive layer.

As mentioned above, conductive layers containing vanadium oxide dispersions can further be prepared in the presence of a polymer. Preferably, the polymer is a vinyl addition polymer dispersion which is a water dispersion (latex) of a vinyl addition polymer. Compositions of vanadium oxide and vinyl addition polymers useful to prepare the conductive layer of the present invention are described in U.S. Pat. No. 5,709,985 (Morrison et al.). Useful co-monomers to prepare the vinyl addition polymer according to the invention include: (a) acrylic and methacrylic acid, itaconic acid, esters of these, and the like; (b) styrene, α-methylstyrene, and parachlorostyrene; (c) acrylamides and methacrylamides; (d) ethylenically unsaturated monomers such as vinyl chloride, vinylidene chloride, vinyl acetate, vinylidene fluoride, and vinyl azlactones, (e) allyl derivatives such as diallyl phthalate, triallyl cyanurate, and the like, and (f) ethylenically unsaturated sulfonated monomers such as 2-acrylamido-2-methyl propane sulfonic add. The polymer of the invention can be a homopolymer, copolymer, terpolymer, or tetrapolymer which, when mixed with colloidal vanadium oxide, will produce a stable dispersion.

Particularly suitable water dispersible polymers for the practice of the present invention are terpolymers of the type described in U.S. Pat. No. 2,627,088 (Alles), comprising from 35 to 96% by weight of vinylidene chloride, from about 3.5 to 64.5% by weight of an ethylenically unsaturated ester, and from about 0.5 to 25% by weight an unsaturated carboxylic acid such as of itaconic acid, the half-methyl ester of itaconic acid, acrylic acid, or methacrylic acid. Alternatively, the unsaturated carboxylic acid of the forgoing composition may be replaced with a nitrile derivative of an unsaturated carboxylic acid such acrylonitrile or methacrylonitrile.

A preferred latex polymer for the purposes of this invention is one that contains about 75 mol % to about 95 mol % vinylidene chloride, about 1 mol % to about 5 mol % acrylonitrile, to about 4 mol % to about 12 mol % methylmethacrylate. One preferred latex polymer for use in the present invention is commercially available under the trade designation DARAN SL-112, from Hampshire Chemical Corporation, Lexington Mass., which is described as a terpolymer of vinylidene chloride, acrylonitrile, and methylmethacrylate.

A coating composition comprising colloidal vanadium oxide suitable for use in the present invention typically contains vanadium oxide in a ratio with a polymer binder of about 1:3 to about 1:600 vanadium to binder, preferably, about 1:20 to about 1:300. As used herein, these weight percentages are calculated from the amount of vanadium in the vanadium oxoalkoxide starting material, and are based on the total weight of the dispersion.

The polymer dispersion and the vanadium oxide dispersion may be mixed together. Generally, this involves stirring the two dispersions together for sufficient time to effect complete mixing. If other materials or particles are to also be incorporated into the coating mixture, it is frequently more convenient to stir the mixture for several hours by placing the mixture into a glass jar containing several glass beads and roll milling it. For example, surfactants and adhesion promoters can be added at the mixing step. Any water compatible surfactant, except those surfactants and adhesion promoters having high acidity or basicity or complexing ability, or which otherwise would interfere with the desired product, are suitable for the practice of the present invention. A suitable surfactant employed in the invention preferably does not alter the conductive or antistatic characteristics of the coating material used in the conductive layer, but allows for the uniform wetting of a substrate surface by the coating solution. Depending upon the substrate, wetting out completely can be difficult, so it is sometimes convenient to alter the coating composition by the addition of organic solvents. A preferred surfactant in the present invention is the para-octyl phenol ether of poly ethylene glycol having approximately 10 carbon atoms, commercially available under the trade designation TRITON X-100, from Aldrich Chemicals, Milwaukee, Wis. Other useful surfactants include phosphate esters, sulfonates such as sodium dodecyl sulfate, and perfluoro-alkyl sulfonic acid salts. It is apparent to those skilled in the art that the addition of various solvents and surfactants is acceptable, as long as the selected solvent does not cause flocculation or precipitation of any of the components of the composition that forms the conductive layer.

The dispersions described herein may be hand spread (for example, by Mayer bar), or coatings can be made by dip coating, spin coating, roll coating, gravure coating, slot or extrusion coating, or slide coating. Coatings can also be formed by spray coating. Once the dispersion is coated, it is dried, generally at a temperature from room temperature up to a temperature limited by the substrate and polymers selected, preferably up to about 200° C., most preferably about 50° C. to about 120° C., for a time ranging from a few seconds to a few minutes to form a conductive layer. The dried coating weight of the conductive layer preferably is in the range of about 20 $mg/m^2$ to about 1 $g/m^2$.

The conductive properties of the conductive layer can be measured by determining the static decay dissipation rate of the coated sample; i.e., by applying voltage and measuring the time required for the charge to dissipate ($V_{eff}$). This measurement can be done on a Static Decay Meter wherein the voltage is initially applied at about 5000 volts and the time for the electric field to decay to less than about 50 volts is measured. This is preferably about 0.01 seconds. The electrical resistivity of the conductive layer is preferably from about 5 log Ω/square to about 11 log Ω/square, and most preferably less than about 9 log Ω/square.

According to the present invention, it may be advantageous to further add an adhesion promoter to the conductive layer to provide additional adhesion between the substrate and subsequent layers. Preferred adhesion promoters in the conductive layer of the present invention include silicon-containing compounds such as epoxy-silanes and amino-silanes, as are useful for the adhesion layer and described above. Particularly preferred silane adhesion promoters include epoxy silane compounds.

The silane compounds as described above, can be present in the conductive layer in any amount that will provide effective adhesion-promoting properties. For example, the conductive layer can contain from about 1 to about 50 parts by weight of a silane compound, and preferably from about 5 to about 20 parts by weight silane compound, based on 100 parts of the dried conductive layer.

The proportions of the silane compound in the conductive layer according to the invention can be widely varied to meet the requirements of the particular photographic element or base film which is to be provided. Typically, the weight ratio of a selected silane to a polymer, such as the preferred latex terpolymer of vinylidene chloride, acrylonitrile, and methylmethacrylate, will be in the range of about 1:99 to about 1:1, and preferably of about 1:19 to about 1:4.

Magnetic Layer

Preferably, the base film in accordance with the present invention, includes a magnetic layer, wherein the adhesion layer is positioned between the conductive layer and the substrate. A magnetic dispersion is useful in forming the magnetic layer as the base film of the invention. Concentrated magnetic dispersions employed in the magnetic layer of the base film may be prepared by sand milling a magnetic pigment in a vehicle that contains compounds that function as plasticizers for the magnetic layer binder resin. An example of a preparation of concentrated magnetic dispersion is provided by Example 1 of U.S. Pat. No. 4,990,276 (Bishop et al.). According to this patent, concentrated magnetic dispersions are provided using a dispersing medium which comprises dialkyl phthalate compounds.

Alternatively, a dispersing medium for the preparation may comprise compounds which function as modifying extenders for the magnetic layer binder resin. An example of such a compound is sucrose acetate isobutyrate, available from Eastman Chemical, Kingsport Tenn. Sucrose acetate isobutyrate is advantageously used for the preparation of concentrated magnetic dispersions useful in the preparation of transparent magnetic layers because it provides a capability to vary the viscosity of the dispersing medium. An unusual property of sucrose acetate isobutyrate is its abrupt change in viscosity with temperature variation or with the addition of solvents. It is possible to do the milling procedure at an elevated temperature, where the viscosity of the dispersing medium is low, in order to prepare a concentrated magnetic dispersion which at room temperature has very high viscosity in which the settling or agglomeration of magnetic particles is retarded. In the case that sucrose acetate isobutyrate is used as a component of the dispersing medium, further plasticization of the magnetic layer binder resin may be desired. In this case an additional plasticizer may be used. Several plasticizers have produced good film properties when used with sucrose acetate isobutyrate. Among these are dioctyl phthalate and dibutyl phthalate. An example of a useful dispersing medium comprising sucrose acetate isobutyrate is a 1:1 weight ratio mixture of sucrose acetate isobutyrate and cyclohexanone.

The dispersing medium can be present in the dispersion during milling in an amount of about 40% to about 70%, more preferably about 50% to about 65% by weight. All percentages herein, unless otherwise indicated, refer to percentages by weight based on the total weight of the dispersion.

The dispersion contains magnetic particles which preferably are acicular or needle like magnetic particles. The average length of these particles along the major axis preferably is less than about 0.3 $\mu$m, and more preferably, less than about 0.2 $\mu$m. The particles preferably exhibit an axial ratio, that is, a length to diameter thickness ratio of up to about 5 or 6 to 1. Preferred particles have a specific surface area of at least about 30 $m^2$/g, more preferably of at least about 40 $m^2$/g. Typical acicular particles of this type include, for example, particles of ferro- and ferrimagnetic iron oxides such as gamma-ferric oxide ($\gamma$-$Fe_2O_3$), complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art. The magnetic particles can be present in the dispersion in an amount of from about 25% to about 75% by weight, preferably about 30% to about 50% by weight.

A preferred particle consists of a cobalt treated $\gamma$-$Fe_2O_3$ having a specific surface area of greater than about 40 $m^2$/g. Particles of this type are commercially available and can be obtained from, for example, Toda Kogyo Corporation under the trade designations CSF 4085V2, CSF 4565V, CSF 4585V and CND 865V; and those commercially available from Pfizer Pigments Inc. under the trade designations RPX4392, RPX5003, RPX5026 and RPX5012. For good magnetic recording, the magnetic particles preferably exhibit coercive force above about 500 Oersteds and saturation magnetization above 70 emu/g.

An Oersted is the cgs unit of magnetic intensity. It is a measure of the magnetic "hardness" of a material. As used herein it refers to magnetic field intensity required to switch magnetic dipole of a particular material. An emu/g is the cgs unit of concentration of magnetic dipoles per unit mass.

A dispersing agent, sometimes referred to as a wetting agent or a surface active agent, can be present in the dispersion to facilitate dispersion of the magnetic particles and/or wetting of the particles with the dispersing medium. This helps to further minimize agglomeration of the magnetic particles. The dispersing agent can be present in the dispersion in an amount up to about 10%, preferably about 1% to about 5% by weight. Useful dispersing agents include a fatty acid amine, and commercially available wetting agents under the trade designations: WITCO EMCOL CC59 (a quaternary amine), from Witco Chemical Corp.; and RHODAFAC PE 510, RHODAFAC RE 610, RHODAFAC RE 960, and RHODAFAC LO 529, all of which are phosphoric acid esters available from Rhone-Poulenc, Cranbury, N.J.

The concentrated magnetic particle dispersion described above can be prepared by procedures known to those in the dispersion art. The dispersion can be prepared by the use of a dispersing machine, for example, a ball mill, a roll mill, a high speed impeller mill, an attritor, or a sand mill.

The concentrated magnetic particle dispersion can be diluted with a suitable non-aqueous organic solvent to make a magnetic layer coating solution. Typically, the non-aqueous organic solvent has dissolved or dispersed therein a binder polymer. Solvents useful for dilution of the concentrated magnetic dispersion include ketones such as acetone, methyl ethyl ketone, methyl isobutyl ketone, cyclohexanone, isophorone; alcohols such as methanol, ethanol, propanol, butanol, isobutanol, isopropanol, methylcyclohexanol; esters such as methyl acetate, ethyl acetate, butyl acetate, isobutyl acetate, isopropyl acetate, ethyl lactate, glycol monoethyl ether acetates; ethers such as diethyl ether, tetrahydrofuran, glycol dimethyl ethers, dioxane; tar types (aromatic hydrocarbons) such as benzene, toluene, xylene, cresol, chlorobenzene, styrene; chlorinated hydrocarbons such as methylene chloride, ethylene chloride, carbon tetrachloride, chloroform, ethylene chlorohydrin, dichlorobenzene; N,N-dimethylformamide, and hexane.

Suitable binders that can be used in the magnetic layer coating solution include, for example, vinyl chloride vinyl acetate copolymers, vinyl chloride vinyl acetate vinyl alcohol copolymers, vinyl chloride vinyl acetate maleic acid polymers, vinyl chloride vinylidene chloride copolymers, vinyl chloride acrylonitrile copolymers, acrylic ester acrylonitrile copolymers, acrylic ester vinylidene chloride copolymers, methacrylic ester vinylidene chloride copolymers, methacrylic esterstyrene copolymers, thermoplastic polyurethane resins, phenoxy resins, polyvinyl fluoride, vinylidene chloride acrylonitrile copolymers, butadiene acrylonitrile copolymers, acrylonitrile butadiene acrylic acid copolymers, acrylonitrile butadiene methacrylic acid copolymers, polyvinyl butyral, polyvinyl acetal, cellulose derivatives, styrene butadiene copolymers, polyester resins, phenolic resins, epoxy resins, thermosetting polyurethane resins, urea resins, melamine resins, alkyl resins, urea formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. These binders are used singly or in combination, and other additives may be added when necessary.

The binders may be provided in a suitable non-aqueous solvent, which preferably is nonpolar, such as methylene chloride to form a composition suitable for casting. The casting composition may include one or more suitable binders. The binder preferably is transparent. The preferred binder is a cellulose organic acid ester such as cellulose acetate. The casting composition can include one or more suitable solvents such as acetone, methyl ethyl ketone, methyl isobutyl ketone, ethyl acetate, butyl acetate, cyclohexanone, butyl alcohol, N,N-dimethylformamide, and mixtures thereof.

Optionally, the binder in the magnetic layer may be crosslinked employing any suitable crosslinking agent such as, for example, organic isocyanates; aziridines, as taught in U.S. Pat. No. 4,225,665 (Schadt, III); and melamines such as methoxy methyl melamine, and the like as set forth in U.S. Pat. No. 5,198,499 (Anderson et al.).

Additionally, the magnetic coating composition as prepared above, can be subsequently modified by the addition of a solution of 3-aminopropyltrimethoxy silane in methyl ethyl ketone to the magnetic coating composition. The modified magnetic coating composition is preferably applied directly to the adhesion layer. The prepared magnetic coating composition described above, may be applied to the adhesion layer using about a 15 line per cm to about a 15 line per cm ruling gravure roll by forward or reverse gravure coating with line speed of about 3 m/min to about 300 m/min and a gravure roll tangential velocity of about 1.5 m/min to about 300 m/min.

The applied magnetic coating solution may be subsequently dried at room temperature to an oven temperature of about 60° C. to about 140° C.

Emulsion Layer

Emulsion layers employed in a photographic element according to the present invention, are preferably positioned on a second surface of the substrate, preferably opposite the layers forming the base film. Emulsion layers containing various types of silver salts can be used to form silver containing emulsion layers, such as silver bromide, silver iodide, silver chloride or a mix of silver halides, such as silver chlorobromide, silver bromoiodide or silver chloroiodide. Suitable emulsion layers are further described in U.S. Pat. No. 5,006,451 (Anderson et al.).

Optionally, the emulsion layer can also contain other photographic compounds which include, for example, development modifiers that function as speed increasing compounds, such as polyalkylene glycols, and others; antifoggants and stabilizers, such as thiazolium salts, and others; developing agents such as hydroquinone, and others; hardeners, such as aldehydes, and others; vehicles, particularly hydrophilic vehicles, such as gelatin, and others; brighteners, such as stilbenes, and others; spectral sensitizers, such as merocyanines, and others; absorbing and filter dyes, such as those described in U.S. Pat. No. 2,739,971 (Sawdey et al) and others; color materials for color photography film elements, such as color-forming couplers; and coating aids, such as alkyl aryl sulfonates, and others. The photographic compounds include, also, mixtures of coating aids which can be used in simultaneous coating operations to coat hydrophilic colloid layers on the subbing layers of elements intended for color photography, for example, layers of silver halide emulsions containing color-forming couplers or emulsions to be developed in solutions containing couplers or other color-generating materials as disclosed above.

Silver halide emulsions employed in a photographic element of the invention can include, for example, coarse, regular or fine grain silver halide crystals or mixtures thereof and can contain such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Other silver halide emulsions as described in U.S. Pat. No. 5,650,265 (Sniadoch et al.), may also be employed.

Priming and Subbing Layers for the Photographic Emulsion Layer

Typically, it is desirable to coat the substrate surface to improve the receptivity of the base film towards the emulsion layers. Because polyester film, which is widely used as a substrate for photographic film, is hydrophobic and is not readily receptive to coating, there various techniques and/or coatings can be applied to the substrate surface to improve the receptivity of substrate surface. By "improve the receptivity" of the substrate surface, it is meant that the substrate surface has been altered in such a way that the process of coating the emulsion layer is facilitated and that the adhesion of the emulsion layer to the substrate surface is improved. Typically, the receptivity of the substrate surface is improved by the application of coatings, for example those described in U.S. Pat. No. 5,532,118 (Bauer, et al.); U.S. Pat. No. 5,510,233 (Nakanishi et al.); U.S. Pat. No. 5,378,592 (Nakanishi et al.), U.S. Pat. No. 5,204,219 (Van Ooij et al.); and U.S. Pat. No. 2,627,088 (Alles et al.).

In accordance with the present invention, the receptivity of the substrate surface can be enhanced by the application of coatings to substrate surface, preferably after the process of orienting the substrate has occurred. Preferably, it is desirable to apply two separate layers to the substrate surface, referred to herein as "an emulsion side adhesion layer" and a "subbing layer." Preferably, prior to the application of any emulsion side coatings, the emulsion side of the substrate, i.e., the second surface, is energy treated, such as by corona discharge, or any other method and under any of the conditions as described above in "Substrate."

A particularly preferred emulsion side adhesion layer comprises a "vinyl hybrid polymer latex" as described above in "Adhesion Layer." Thus, in accordance with the present invention, both surfaces of the substrate are coating with a composition as described above for the adhesion layer. Use of the same composition for the adhesion layer on both sides of the substrate is advantageous because it can simplify manufacturing of a photographic element.

The thickness of the emulsion side adhesion layer according to the present invention typically ranges from about 10 nm to about 1000 nm, preferably from about 10 nm to about 500 nm, and more preferably from about 200 nm to about 400 nm.

A subbing layer composition which is useful in conjunction with an emulsion side adhesion layer is described in U.S. Pat. No. 5,204,219 (Van Ooij et al.). Typically, a coating is formed from a gelled or hydrolyzed network of inorganic particles, preferably inorganic oxide particles, which contains a silane adhesion promoting compound, such as those described above in connection with the adhesion layer. The thickness of the emulsion side subbing layer according to the present invention typically ranges from about 10 nm to about 1000 nm, preferably from about 10 nm to about 500 nm, and more preferably from about 200 nm to about 400 nm.

Photographic Elements

In a preferred embodiment, imaging elements of the invention are photographic elements, such as photographic films, photographic papers or photographic glass plates, in which the image-forming contains an emulsion layer as described above. The photographic elements of the present invention can be simple black-and-white or monochrome elements containing a light-sensitive silver halide emulsion or they can be multilayer and/or multicolor elements.

Color photographic elements of the invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art and are further described in U.S. Pat. No. 5,597,680 (Wang et al.).

Optional layers

It may desirable to overcoat the magnetic layer with a protective overcoat or lubricating layer such as a wax layer. Suitable lubricants include silicone oil, silicones having polar groups, fatty acid-modified silicone compounds, polyolefins, fatty acids, alcohols derived from fatty acids having 8 to 22 carbon atoms, fatty acid amides, and fatty acid esters. Specific examples of alcohols, acids and esters include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, penta-erythritol tetrastearate, oleyl alcohol and lauryl alcohol. Carnauba wax is preferred.

The following examples are illustrative of specific embodiments and/or methods according to the present invention. A wide variety of variations from the following examples are within the scope of the present invention and are only to be limited by the appended claims.

EXAMPLES

Example 1

Preparation of a Base Film

A base film employed in an APS (Advanced Photo System) color film was prepared. The base film contained a substrate, a sulfonated polymer/vinyl polymer adhesion layer, a transparent conductive layer containing vanadium oxide (antistatic layer), and a transparent magnetic layer.

Hydrolyzed glycidoxypropyl-trimethoxy-silane solution was prepared by adding 2.0 mL of 1.0 N aqueous hydrochloric acid (available from Aldrich Chemicals, Milwaukee, Wis.) to a mixture of 50.0 g of glycidoxypropyl-trimethoxysilane (available from Aldrich Chemicals, Milwaukee, Wis.) and 948 g of deionized water and stirring for 18 hours at room temperature. An adhesion coating solution was prepared by adding 110.0 g of 40 wt % EASTEK 2400 sulfonated polyester/vinyl polymer hybrid resin dispersion in water (available from Eastman Chemicals, Kingsport, Tenn.), 90.2 g of hydrolyzed glycidoxypropyl-trimethoxy-silane solution and 10.0 g of 10 wt % TRITON-X-100 surfactant (available from Aldrich Chemicals, Milwaukee, Wis.) to 1790 g of deionized water. The prepared adhesion layer coating solution was subsequently applied by die coating to a poly(ethylene naphthalate) base film substrate having a 87 μm thickness (commercially available under the trade designation TEONEX, from Teijin LTD, Tokyo Japan). The wet coating thickness of the adhesion layer was 12.0 μm and the line speed was 30.5 meters per minute (m/min). Immediately prior to coating, the base film support was corona treated in an amount of 0.5 Joules per square cm (600 watts power over a 23 cm width of film moving at 30.5 m/min).

The adhesion layer applied to the base film substrate was subsequently dried in an oven having three oven temperature zones. Each oven temperature zone had a length of 3.0 meters, and the temperature settings for each zone were set at 82° C., 104° C., and 104° C. respectively. The applied film was dried in each respective oven temperature zone for about 6 seconds to yield a base film substrate comprising an adhesion layer coated on one surface.

A colloidal vanadium oxide dispersion was prepared as described in Example 1 of U.S. Pat. No. 5,407,603 (Morrison). Namely, a conductive layer coating solution was prepared by adding 5.0 g of 1.0 wt % colloidal vanadium oxide, 9.26 g of 54 wt % of a polyvinylidene chloride latex, commercially available under the trade designation DARAN SL-112, from Hampshire Chemicals, Lexington, Mass., 10.0 g of hydrolyzed glycidoxypropyl-trimethoxy-silane solution and 1.0 g of 10 wt % TRITON-X-100 surfactant (available from Aldrich Chemicals, Milwaukee, Wis.) to 921 g of deionized water.

The prepared conductive layer coating solution was applied to the adhesion layer using a 59 line per cm ruling gravure roll by reverse gravure coating with line speed of 4.6 m/min and a gravure roll tangential velocity of 6.1 m/min. The applied wet coating solution was subsequently dried in an oven having three oven temperature zones. Each oven temperature zone had a length of 0.9 meters and the temperature settings for each zone were set at 80° C., 105° C., and 105° C., respectively. The applied conductive layer was dried in each respective oven temperature zone for about 20 seconds to yield a base film containing a substrate, an adhesion layer, and a conductive layer.

A concentrated magnetic dispersion was prepared which contained cobalt doped $\gamma$-$Fe_2O_3$, sucrose acetate isobutyrate, cyclohexanone, and dispersant. TODA CSF 4085V2magnetic pigment (450 g, available from Toda Kogyo Corporation, Yamaguchi, JP) was added with stirring to a solution of 22.5 g of RHODAFAC PE-510 dispersant (available from Rhone-Poulenc, Cranbury N.J.), 264 g of sucrose acetate isobutyrate (available from Eastman Chemical, Kingsport, Tenn.), and 264 g of cyclohexanone (available from Aldrich Chemical Company, Milwaukee, Wis.). The mixture was stirred using a standard stirrer until all of the magnetic pigment had been wetted and for one half hour thereafter. The concentrated magnetic dispersion was transferred to a 0.5 L capacity sand mill (available from Eiger Machinery Inc., Grayslake Ill.) and milled using 1.0 mm zirconium silicate media at about 2000 rpm for a period of about 3 hours to give a concentrated magnetic dispersion (containing 45 wt % TODA CSF4085V2 magnetic pigment, 2.3 wt % RHODAFAC PE-510 surfactant, 26.4 wt % cyclohexanone, and 26.4 wt % sucrose acetate isobutyrate).

A magnetic coating solution was prepared by adding 100 g of cyclohexanone (available from Aldrich Chemical Company, Milwaukee, Wis.), 3.2 g dibutyl phthalate (available from Aldrich Chemical Company, Milwaukee, Wis.) and 12.4 g of a concentrated magnetic dispersion containing 45 wt % TODA CSF4085V2 magnetic pigment (available from Toda Kogyo Corporation, Yamaguchi, JP), 2.3 wt % RHODAFAC PE-510 surfactant (available from Rhone-Poulenc, Cranbury N.J.), 26.4 wt % cyclohexanone (available from Aldrich Chemical Company, Milwaukee, Wis.), and 26.4 wt % sucrose acetate isobutyrate (available from Eastman Chemicals, Kingsport Tenn.) to 1000 g of 10 wt % EASTMAN CA-398-3 cellulose acetate solution (available from Eastman Chemicals, Kingsport Tenn.) in methyl ethyl ketone (available from Aldrich Chemical Company, Milwaukee, Wis.) while agitating using a POLYTRON PT 10/35 homogenizer (available from Fisher Scientific, Itasca, Ill.).

The magnetic coating solution prepared above, was subsequently modified by adding 13.4 g of a 10 wt % solution of 3-aminopropyl-trimethoxy-silane in methyl ethyl ketone to 150 g of the magnetic coating solution while the solution was under agitation using a POLYTRON PT 10/35 homogenizer. The modified magnetic coating solution was applied directly to the chlorinated polymer layer of the base film using a 35 line per cm gravure roll by reverse gravure coating with a line speed of 4.6 m/min and a gravure roll tangential velocity of 6.1 m/min. The applied wet magnetic coating solution was dried in an oven having three oven temperature zones. Each oven temperature zone had a length of 0.9 meters and the temperature settings for each zone were set at 80° C., 105° C., and 105° C. respectively. The applied magnetic coating solution was dried in each respective oven temperature zone for about 40 seconds to yield a base film having a substrate, an adhesion layer, a conductive layer, and an overlying magnetic layer.

In a separate experiment, an emulsion side adhesion layer and emulsion side subbing layer were prepared.

An emulsion side adhesion layer was prepared in a manner identical to the preparation of the adhesion layer above.

A subbing layer coating solution was prepared by adding sequentially NALCOAG 2326 Colloidal Silica (172.0 g of 14.5 weight % dispersion available from Nalco Chemical Company, Naperville, Ill.), 2.5 g of aminopropyl triethoxy silane (available from Aldrich Chemical Company, Milwaukee, Wis.), and 5.0 g of a 10 weight % solution of TRITON X-100 surfactant (available from Aldrich Chemical Company, Milwaukee, Wis.) to 821 g of deionized water. After addition, the solution was shaken for 30 seconds. The prepared subbing layer coating solution was subsequently applied by die coating to the emulsion side adhesion layer. The wet coating thickness of the subbing layer was 12.5 $\mu$m and the line speed was 30.5 m/min.

Base Film Testing Results

The base film containing the adhesion layer, the conductive layer, and the overlying magnetic layer exhibited a moderate level of haze (18%) when measured using a Gardner XL-211 Hazeguard System (available from Paul N. Gardner Company, Inc., Pompano Beach Fla.) following the manufacturer's instructions. The base film exhibited a low level of coloration (blue light optical density of about 0.15 as measured using a Macbeth transmittance densitometer, available from Gretag-Macbeth Company, New Windsor N.Y.) and a static decay rate of 0.01 seconds for decay of a 5000V charge to less than 50V (using an Electrotech 406 D Static Decay Meter according to the manufacturer's instructions. The Electrotech 406 D meter is available from Electrotech Systems, Glenside, Pa.).

The dry adhesion of the magnetic layer in the prepared base film was tested by cutting a 10×10 crosshatch pattern (giving 100 approximately 1 mm squares) into the base film, and peeling the base film using 3M Brand No. 610 transparent pressure sensitive tape (Minnesota Mining and Manufacturing, St. Paul, Minn.). The percent adhesion is the number of crosshatch squares remaining on the substrate subsequent to the peeling step. The dry adhesion of the base film measured by this method was 100%.

The wet adhesion of the magnetic layer was tested by developing the base film sample according to the standard C-41 chemical process as described in *British Journal of Photography Annual*, 1997, pp 201–205 but omitting the drying steps. Immediately following the wet chemical processing, the adhesion of the magnetic layer in the wet film was tested by cutting a star shaped pattern into the base film and rubbing the base film with a finger tip covered by a rubber glove. Wet adhesion was given a scholastic numerical score according to the following scale:

0 Complete removal of the coating layer with light rubbing;

3 Coating partially removed by light rubbing and completely removed by vigorous rubbing;

5 Coating partially removed by vigorous rubbing;

8 Slight removal of coating and less than 1 mm width of cut lines resulting from vigorous rubbing;

10 No coating removed and width of cut lines was not increased by vigorous rubbing;

By this method, the wet adhesion of the base film yielded a scholastic score of 9. This score compares with the magnetic layer of films commercially available under the trade designations AGFACOLOR FUTURA 200 Advanced Photo System film (available from Agfa-Gevaert N.V, Mortseland Belgium), having a scholastic score of 6, and FUJICOLOR HI-SPEED 400 ADVANCED PHOTO SYSTEM film (available from Fuji Film USA, Elmsford N.Y.), having a scholastic score of 10.

The receptivity of the polymeric support which had been coated with the emulsion side adhesive priming layer and the subbing layer was tested by coating onto the support a photographic emulsion essentially as described in Example 1 of U.S. Pat. No. 5,821,042 (Massirio et al.) and measuring dry and wet adhesion. The dry adhesion and wet adhesion was determined in a manner similar to that described above for the magnetic layer. The value for dry adhesion was 100% and the value for the wet adhesion yielded a scholastic score of 8 on a scale of 1 to 10. The dry adhesion after processing was measured by developing the film sample according to the standard C-41 process without omission of the drying step. In this case the dry adhesion was also 100%.

Example 2—Comparative Example

Base Film Lacking an Adhesion Layer

A base film was prepared as described above in Example 1, except the adhesion layer was omitted from the base film. In the prepared base film, the dry adhesion was measured as described above in Example 1. In the base film lacking an adhesion polymer layer, the dry adhesion value was determined to be 98%.

The wet adhesion of the base film was also measured as described above in Example 1, yielding a scholastic score of 2. These results show that the adhesion of a magnetic layer in a wet chemically processed base film can be greatly improved by insertion of an adhesion layer between the substrate and the conductive layer.

All patents, patent applications, and publications disclosed herein are incorporated by reference in their entirety, as if individually incorporated. The foregoing detailed description and examples have been given for clarity of understanding only. No unnecessary limitations are to be understood therefrom. The invention is not limited to the details shown and described, for variations obvious to one skilled in the art will be included within the invention defined by the claims.

What is claimed is:

1. A base film comprising:

a substrate having a first and a second surface, an adhesion layer coated on the first surface of the substrate wherein the adhesion layer comprises a vinyl-addition polymer and a sulfonated polyester polymer, a magnetic layer, and a conductive layer comprising vanadium oxide, wherein the conductive layer is positioned between the adhesion layer and the magnetic layer.

2. The base film of claim 1, further comprising an emulsion side adhesion layer coated on a second surface of the substrate.

3. The base film of claim 1 wherein the adhesion layer further comprises an adhesion promoter.

4. A base film comprising:

a substrate having a first and a second surface, an adhesion layer coated on the first surface of the substrate wherein the adhesion layer comprises a vinyl-addition polymer and a sulfonated polymer, a magnetic layer, and a conductive layer comprising vanadium oxide, wherein the conductive layer is positioned between the adhesion layer and the magnetic layer, there is an adhesion promoter in said adhesion layer, and the adhesion promoter comprises an epoxy-silane.

5. The base film of claim 1 wherein the conductive layer further comprises a chlorinated latex polymer.

6. The base film of claim 5 wherein the conductive layer comprises a weight ratio of the vanadium oxide to the chlorinated latex polymer in the conductive layer of about 1:3 to about 1:600.

7. The base film of claim 5 wherein the chlorinated latex polymer comprises a polyvinyl chloride.

8. The base film of claim 1 wherein the vinyl addition polymer is formed from alkyl esters of acrylic monomers.

9. The base film of claim 8 wherein the alkyl esters of acrylic monomers are selected from the group of methyl methacrylate, ethyl methacrylate, butyl methacrylate, ethyl acrylate, and butyl acrylate.

10. The base film of claim 1 wherein the surface of the substrate is treated with an energy source.

11. The base film of claim 10 wherein the energy source is selected from the group of corona discharge, glow discharge, flame, electron bombardment, ultraviolet radiation, and a combination thereof.

12. The base film of claim 1 wherein the substrate comprises a polyester.

13. The base film of claim 12 wherein the polyester is selected from the group of poly(ethylene terephthalate) and poly(ethylene naphthalate).

14. The base film of claim 1 wherein the magnetic layer possesses better wet adhesion to the substrate than the same base film without the adhesion layer between the substrate and the conductive layer.

15. The base film of claim 1 wherein the base film exhibits a wet adhesion scholastic score of at least about 4.

16. The base film of claim 1 wherein the magnetic layer is formed from a composition comprising a non-aqueous solvent and a plurality of magnetic particles.

17. The base film of claim 1 wherein the magnetic layer is a transparent magnetic layer.

18. The base film of claim 1 wherein the conductive layer is a transparent conductive layer.

19. The base film of claim 1 wherein the base film exhibits a haze level of less than about 15%.

20. The base film of claim 1 wherein the base film exhibits a static dissipation rate from a charge of about 5000V to about 50V in less than about 0.05 seconds.

21. A base film comprising a substrate, an adhesion layer coated on a surface of the substrate wherein the adhesion layer comprises a vinyl addition polymer, a sulfonated polymer and an epoxy-silane, a transparent magnetic layer, and a transparent conductive layer comprising vanadium oxide, wherein the conductive layer is positioned between the adhesion layer and the magnetic layer.

22. A silver halide photographic element comprising:

an adhesion layer coated on a first surface of the substrate, wherein the adhesion layer comprises a vinyl addition polymer and a sulfonated polyester polymer, a magnetic layer, and a conductive layer comprising vanadium oxide, wherein the conductive layer is positioned between the adhesion layer and the magnetic layer, and a silver halide emulsion layer is present on a second surface of the substrate.

23. The photographic element of claim 22 further comprising an emulsion side adhesion layer coated on the second surface of the substrate between the emulsion layer and the second surface of the substrate.

24. The photographic element of claim 23, further comprising a subbing layer on the emulsion side adhesion layer.

25. The photographic element of claim 23, wherein the emulsion side adhesion layer comprises a vinyl addition polymer and a sulfonated polymer.

26. The base film of claim 2, further comprising a subbing layer on the emulsion side adhesion layer.

* * * * *